(No Model.)

F. V. DE BEM.
FISHERMAN'S REEL.

No. 522,503. Patented July 3, 1894.

Witnesses

Inventor
Francisco Vieira deBem.
By Attorneys

UNITED STATES PATENT OFFICE.

FRANCISCO VIEIRA DE BEM, OF GLOUCESTER, MASSACHUSETTS.

FISHERMAN'S REEL.

SPECIFICATION forming part of Letters Patent No. 522,503, dated July 3, 1894.

Application filed October 25, 1893. Serial No. 489,073. (No model.)

*To all whom it may concern:*

Be it known that I, FRANCISCO VIEIRA DE BEM, a citizen of the United States, residing at Gloucester, in the county of Essex, State of Massachusetts, have invented certain new and useful Improvements in Fishermen's Reels; and I do hereby declare the following to be a full, clear, and exact description of the invention, such as will enable others skilled in the art to which it appertains to make and use the same.

This invention relates to fishermen's reels to facilitate the winding up and the paying out of the line.

The improvement consists of the novel features and the peculiar construction and combination of the parts which will be hereinafter more fully described and claimed and which are shown in the annexed drawings, in which—

Figure 1:
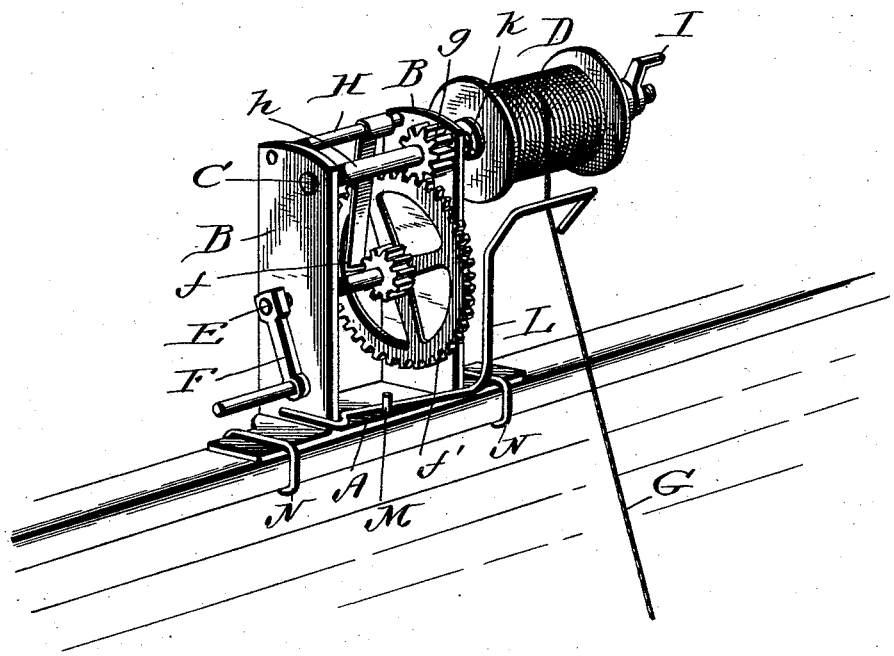
Figure 2:
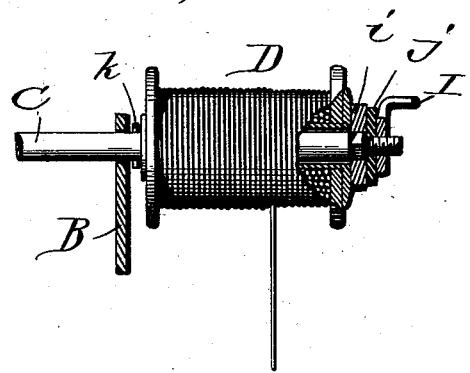

Figure 1 is a perspective view showing the reel in position on the gunwale of a fishing smack. Fig. 2 is a detail view of the instrumentalities for securing the windlass on its shaft.

The base A has vertical standards or upright B rising therefrom near each end which support the operating parts. A shaft C is journaled in the upper ends of the standards and has one end projected to form a support for a reel D. A second shaft E is journaled at its ends in the standards and is provided at one end with a crank F by means of which the said shaft is rotated and between its ends with a pinion $f$ and a gear wheel $f'$, the latter meshing with a pinion $g$ on the shaft C to rotate the latter. A rod H bracingly connecting the upper ends of the standards, forms a support for a pawl $h$ which is adapted to slide thereon, the lower end of the pawl being constructed to engage with the pinion $f$ to lock the shaft E from rotation in either direction.

The reel D is a spool or drum of ordinary construction and is loosely mounted upon the projecting end of the shaft C. One end of the line G is attached to the windlass and is adapted to wind thereon. The extremity of the projecting portion of the shaft C is threaded for a short distance and receives a hand or crank-nut I. Between the hand or crank-nut and the opposing end of the windlass are interposed a metal washer $i$ and a disk $j$ of rubber, leather or similar material to form a lock mechanism to secure the reel on the said shaft. The shaft C is mounted in the standards so as to turn therein, only, and the windlass is held on the projecting end between a stop $k$ and the crank-nut I.

When it is desired to pay out the line G, the hand or crank nut I is loosened so as to release the windlass and permit the same to rotate freely and unwind the line. To take in or wind up the line the reel is secured on the shaft C which is effected by turning up the hand or crank nut so as to cause the windlass and shaft to revolve together, the shaft being rotated by the crank E through the gearing herein set forth. The pawl $h$ serves as a convenient means to hold the line at the required position by locking the train of gearing.

A guard L has its upper end constructed to prevent the line from getting over the ends or heads of the windlass and its lower end extending parallel with the base A and bent to embrace one of the standards. A projecting pin M engages with the horizontal portion of the guard and holds the same in engagement with the standards.

The device is secured to the boat by being placed upon the gunwale and having clips N slipped over the end portions of the said base and embracing the edges of the gunwale. By moving the clips on the gunwale the device can be readily detached from the boat.

Having thus described my invention, what I claim, and desire to secure by Letters Patent, is—

1. In a fisherman's reel, the combination with the base A of the uprights B B, the shaft C journaled thereon and projecting beyond one of the same, a reel D mounted upon said end and adapted to be made fast or loose thereon, the shaft E and crank F, the pinion $f$ and gear $f'$ mounted upon the shaft E, the pinion $g$ mounted upon the shaft C, the rod H and pawl $h$ mounted thereon to engage the pinion $f$ all arranged substantially as shown and described.

2. In a fisherman's reel, the combination with the base and uprights and the reel and operating mechanism carried thereby, of a guard for the line having its lower portion bearing against the edges of uprights, and having the lower end embracing one of the said uprights, and a pin to engage with and hold the guard in place, substantially as specified.

In testimony whereof I affix my signature in presence of two witnesses.

FRANCISCO VIEIRA DE BEM.

Witnesses:
LAURA McQUINN,
CHARLES F. YORK.